Jan. 20, 1959          A. S. VOLPIN          2,869,574
AUTOMATIC LUBRICATED GATE VALVE

Filed Dec. 23, 1953          4 Sheets-Sheet 3

A. S. Volpin
INVENTOR.

BY

ATTORNEY

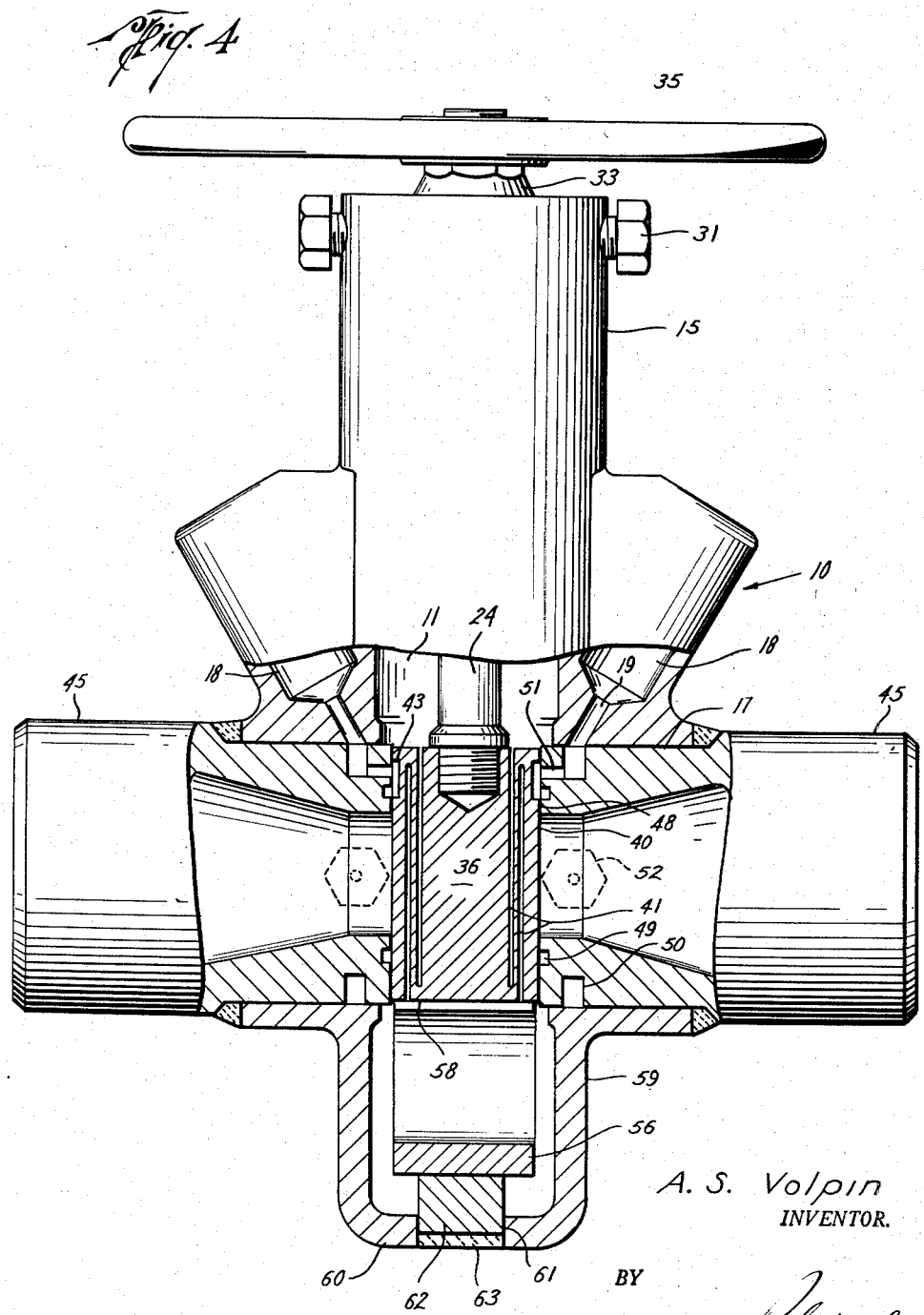

2,869,574

AUTOMATIC LUBRICATED GATE VALVE

Alexander S. Volpin, Miami Beach, Fla.

Application December 23, 1953, Serial No. 399,973

2 Claims. (Cl. 137—246.12)

This invention relates to improvements in gate valves and particularly in gate valves of the automatic lubricated type.

In some of my U. S. patents, particularly No. 2,433,638, December 30, 1947, No. 2,657,898, November 3, 1953, and No. 2,660,397, November 24, 1953, I have disclosed automatic lubricated gate valves employing various arrangements of lubricant reservoirs and lubricant and sealing channels in the seat, body and gate elements of the valves. These types of valves, as well as other more conventional forms of gate valves, generally employ a two-piece construction comprising a hollow body having a large opening therein to provide access to the interior of the body for installation of the gate and seat elements, and the lubricant reservoirs and associated parts, and a bonnet which is bolted or screwed to the body to close the opening and to seal about the gate stem. Such two-piece constructions are comparatively complicated to manufacture and are subject to leakage at the connection of the bonnet to the body under high pressure service and particularly in the large sizes in which the automatic lubricated gate valves are most often constructed and used.

The present invention, therefore, has for its principal object the provision of a gate valve of one-piece body construction, that is, one in which the conventional separable bonnet, as such, has been eliminated by making the bonnet portion integral with the body, and which will be comparatively of simple and low cost construction.

An important object is to provide an automatic lubricated gate valve in which the body and bonnet portions comprise an integrally formed one-piece member.

A further object is to provide a one-piece body for automatic lubricated gate valves, wherein the lubricant reservoirs are formed in the body wall and open to the exterior thereof on opposite sides of the gate chamber.

Another object is to provide an automatic lubricated gate valve construction in which the gate seats and lubricant channels are formed in the inner ends of flow nozzles which are separately fabricated and inserted in the flow passages of the valve body.

A further object is the provision of an improved gate having resilient seat-engaging faces integrally formed in the gate.

Other and more specific objects and advantages of this invention will become more readily apparent from the following detailed description when read in conjunction with the accompanying drawing which illustrates several useful embodiments in accordance with this invention.

In the drawing:

Fig. 4 is a side elevational view, partly in section, of a through-conduit type gate valve in accordance with another embodiment of this invention.

Figure 1:
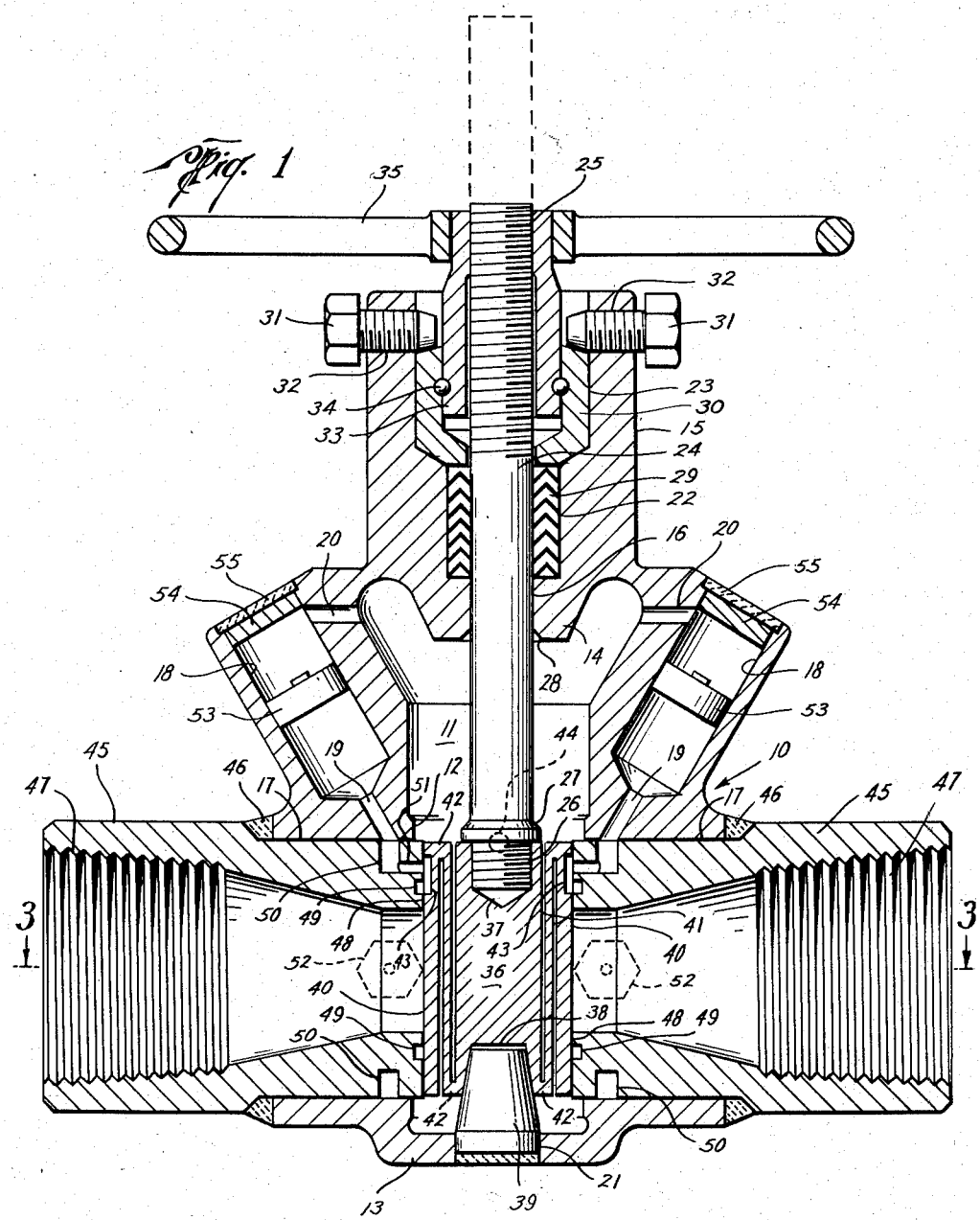
Fig. 1 is a vertical sectional view through a gate valve in accordance with one embodiment of this invention in closed position.
Figure 2:
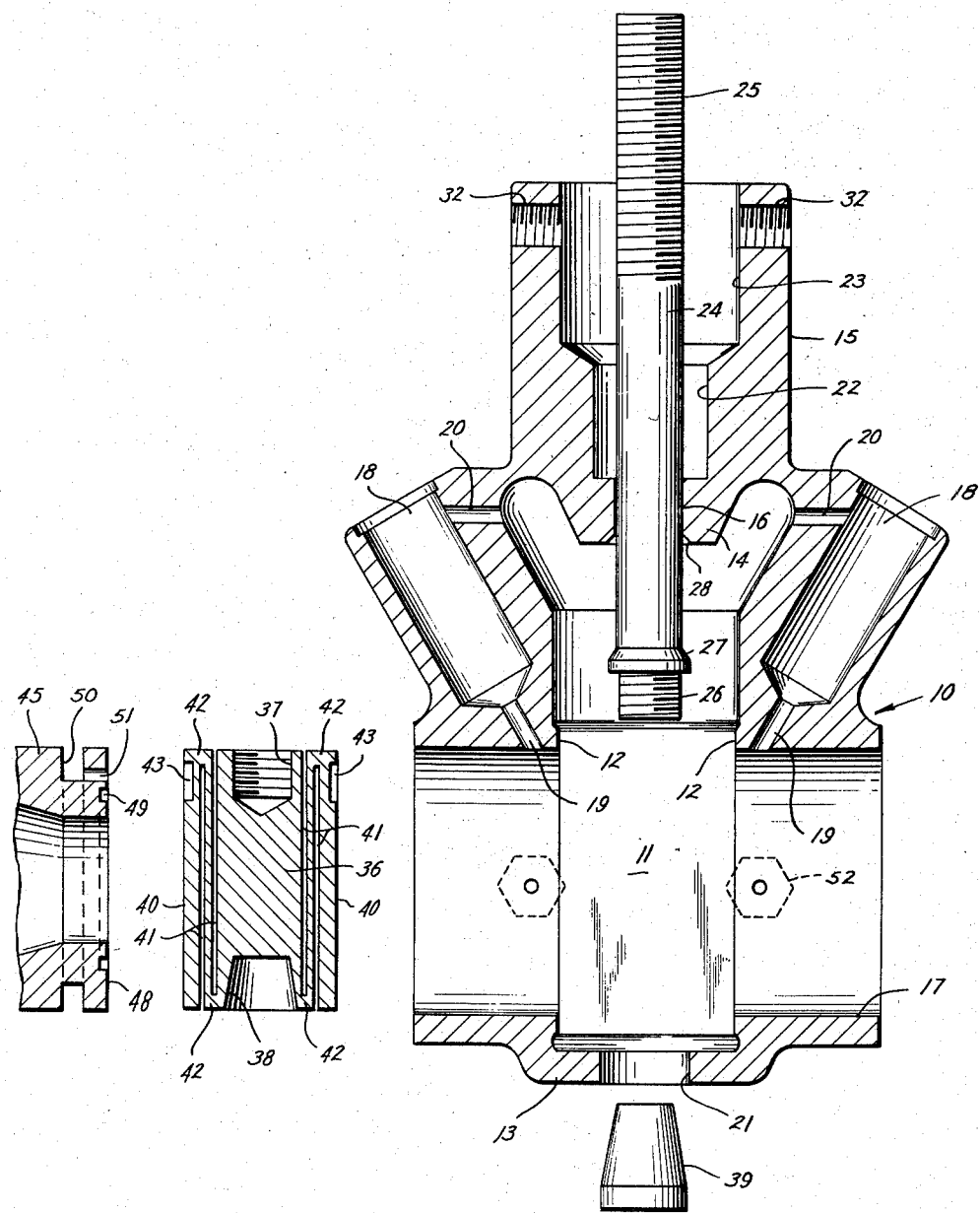
Fig. 2 is a partially exploded vertical sectional view of the valve to better illustrate the one-piece construction of the body and the manner of assembly of some of the elements of the valve.
Figure 3:
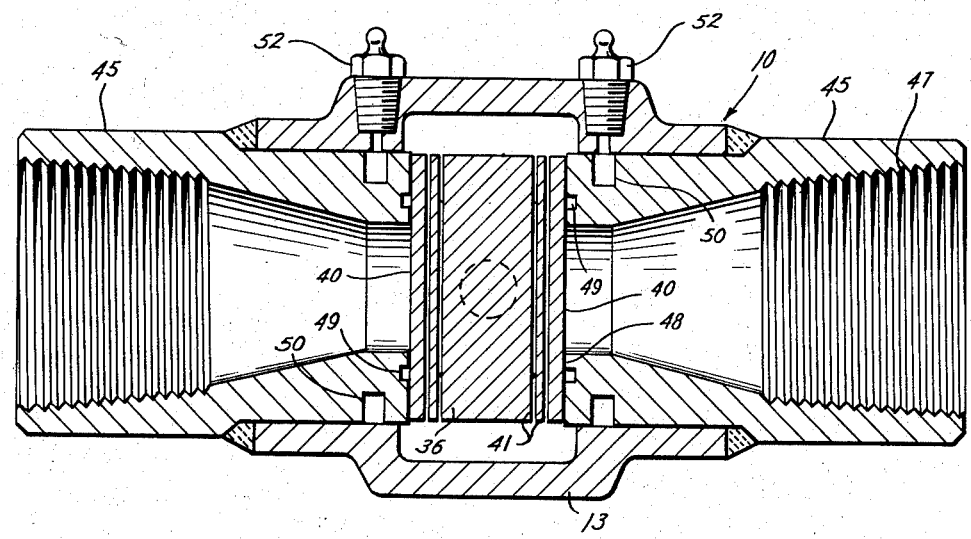
Fig. 3 is a sectional view along the flow axis of the valve taken generally along line 3—3 of Fig. 1.

Referring to the embodiment illustrated in Figs. 1 to 3, the valve comprises a hollow body, designated generally by the numeral 10, which, as best seen in Fig. 2, is of one-piece, metallic construction, being fabricated in any generally conventional manner, as by casting, welding, forging, and the like. Body 10 encloses a centrally positioned gate chamber 11 having generally flat, parallel side walls 12—12, a bottom wall 13 and an upper end wall 14 which also defines the bottom wall of a stem-receiving bonnet or neck 15 formed integrally with body 10 and of lesser width than the main portion of body 10. Neck 15 has an axial bore 16 opening through wall 14 into chamber 11. Body 10 is provided with coaxial openings 17—17 which communicate with the opposite sides of chamber 11 through walls 12 and extend transversely of the body to the exterior thereof and define the flow passage through the valve. Lubricant reservoirs 18—18 are provided in the walls of body 10 on opposite sides of chamber 11 and above the respective openings 17—17, the reservoirs being preferably disposed at divergent angles to the longitudinal axis of the body so that their outer ends may open through the exterior of the body. The inner ends of the reservoirs communicate with the interiors of the adjacent openings 17—17 by means of passages 19—19. Channels 20—20 provide means for fluid pressure communication between the interior of chamber 11 and the upper portions of reservoirs 18—18. Bottom wall 13 is provided with an opening 21 registering with bore 16 and the latter is provided with successive enlargements 22 and 23 for reception of the stem packing and stem drive elements as will be described more fully hereinafter.

As will be seen from the foregoing, body 10 constitutes a unitary element which may be fabricated as such in any conventional manner and which will require a minimum amount of machining, all of which may be conducted from the outside of the body, thereby greatly simplifying the construction and reducing the fabricating costs.

The other parts of the valve and the manner of assembly will now be described. A stem 24 is journalled in neck 15 and has a drive thread section 25 at its upper end and a threaded portion 26 at its lower end. A tapered annular shoulder 27 is provided about the stem just above threaded portion 26 and is adapted to engage a tapered seat 28, formed in the lower face of wall 14 about the lower end of bore 16, to form a seal for this bore when the stem is retracted. Stem 24 will be inserted into the body by passing it upwardly through opening 21, the diameter of the latter being large enough to allow passage of shoulder 27 therethrough.

The stem sealing and stem drive elements are of generally conventional form. Packing 29 is seated in enlargement 22 which forms a stuffing box for the stem. A tubular packing gland 30 is slidably mounted in enlargement 23 and is urged into compressive engagement with packing 29 by means of taper screws 31 which are threaded through radial openings 32 in the wall of neck 15 and engage the correspondingly tapered upper end of gland 30. In the illustrative embodiment the valve is of the rising stem type and reciprocation of the stem is effected by means of a drive nut 33 which is screwed on threaded section 15 and rotatably anchored in the bore of gland 30 by means of balls 34. An operating wheel 35 is secured to the exterior of drive nut 33 which will be driven by rotation of the operating wheel to raise and lower the stem.

The valve gate comprises a flat disk-shaped body 36 (see particularly Fig. 2) which is made slightly smaller in diameter than openings 17 whereby the body may be inserted into chamber 11 by sliding it laterally through one of the openings 17. The gate body is provided with an internally threaded socket 37 on its upper end to receive threaded portion 26 of the stem, and with an upwardly tapering frusto-conical socket 38 on its lower edge co-axial with socket 37. Socket 38 is adapted to receive the end of a correspondingly tapered centering and guide plug 39 which is inserted in opening 21 and welded or otherwise secured in the opening to form a fluid-tight closure therefor.

Gate body 36 is provided with integral resilient end faces 40—40 which are formed from the gate body by sawing or otherwise providing a pair of spaced parallel slots or kerfs 41—41 which extend through the body parallel to the end faces. One of the slots of each pair extends from the periphery of the body at one side thereof to a point just short of the periphery of the body at the opposite side, while the second slot of each pair extends in the reverse direction. By means of this arrangement, each of the end faces 40—40 remain connected to the gate body by the short sections of metal provided at opposite sides of the body which thereby form resilient double-hinges, indicated at 42—42, which provide a novel resilient connection between the end faces and the gate body. This construction eliminates the extra parts and other complexities of conventional spring-pressed separate gate sections, but which retains effective resilient seat-engaging characteristics when closed and under line pressures. Each end face 40 has a small circular depression or recess 43 near its upper end.

In assembling the gate on the stem, the gate will be slipped through an opening 17 into chamber 11 whereupon the threaded end 26 of the stem will be screwed into socket 37 and a spot-weld, indicated at 44 (Fig. 1), will be applied to the juncture of shoulder 27 with the periphery of gate 36 to secure the gate to the stem. Plug 39 will then be inserted in opening 21 and welded in place therein in position to engage socket 38 to thereby limit the extent of closing movement of the gate and to center it in the gate chamber.

A pair of flow nozzles 45—45, which are separately fabricated parts, are inserted in the openings 17—17 and are rigidly secured to body 10, as by welding, indicated at 46. In the illustrative embodiment the outer ends of the flow nozzles are shown as internally threaded at 47 for connection into a flow line. It will be understood that flow nozzles may, if desired, have conventional flanges or other known connection elements for connecting the valve into a flow line.

The inner end of each of the flow nozzles is machined to provide a smooth annular seat face 48 engageable by the adjacent end face 40 of the gate. An annular lubricant conducting groove 49 is provided in each seat face 48 and is disposed thereon to be in communication with the adjacent recess 43 when the gate is in closed position. An annular lubricant supply groove 50 is provided in the outer periphery of each of the nozzles 45 at a point spaced slightly from seat face 48 and positioned to register with the end of lubricant passage 19. A short lubricant channel 51 extends from supply groove 50 to a point on seat face 48 which is spaced radially outwardly a short distance from groove 49, the end of channel 51 registering with recess 43 when the gate is in closed position as best seen in Fig. 1. Conventional lubricant supply fittings 52—52 are mounted in body 10 to communicate with supply grooves 50 whereby lubricant may be introduced to fill supply grooves 50 and reservoirs 18. The latter are fitted with slidable pistons 53—53 and the outer ends of the reservoirs are closed by means of plugs 54—54 which may be secured as by welding 55—55.

It will be understood the flow nozzles will be so position in the valve body that end faces 40 of the gate will be in close sliding engagement with seat faces 48. When the valve is closed, the gate will be urged against the downstream seat and recess 43 will place groove 49 in communication with chanel 51, supply groove 50, passage 19 and reservoir 18. Fluid pressure in chamber 11 will be transmitted through channel 20 to the downstream reservoir 18 and will be exerted on piston 53 to force lubricant from the reservoir into groove 49 through the interconnecting passages to thereby assure effective sealing of the gate.

Figure 5:
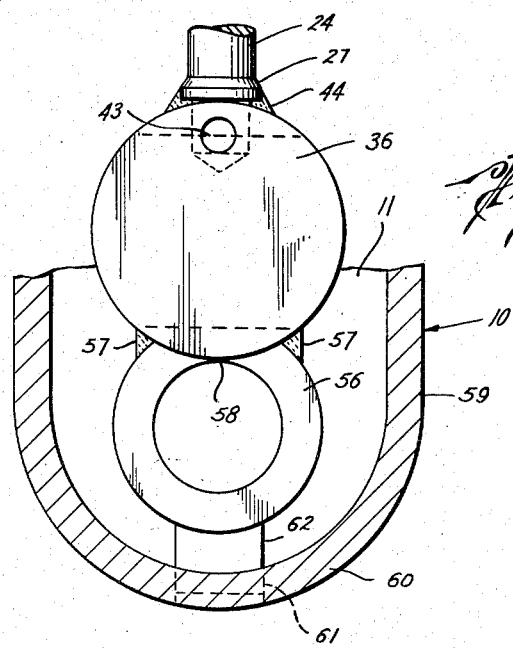
Fig. 5 is a detail of the embodiment illustrated in Fig. 4.

Figs. 4 and 5 illustrate another embodiment of this invention as applied to a through-conduit type of gate valve, that is, one in which the gate is provided with a flow port which, in the open position, registers with, and has substantially the same diameter as, the flow passages through the valve body to provide a full open uninterrupted flow passage through the valve.

The structure of this through-conduit embodiment differs from that of the previously described embodiment in only a few elements, the other elements being identical with those of the previously described embodiment and are, therefore, designated by the same reference numerals. The principal features of difference include a tubular flow port 56 which is secured, as by welding 57, to the lower end of gate 36, the upper portion of port 56 being arcuately recessed at 58 to receive the adjacent sector of gate 36 to thereby reduce the over-all length of the gate structure. The lower portion of body 10 is extended downwardly to form a well 59 having a depth sufficient to accommodate flow port 56 when the gate is moved downwardly to the closed position shown in Fig. 4. The lower end of well 59 will be closed by a bottom wall 60 having an opening 61 therein which, like opening 21 of the preceding embodiment, is large enough to allow stem 24 to be passed upwardly therethrough during assembly. A plug 62 is installed in opening 61 and is positioned to extend into chamber 11 a suitable distance to limit the extent of downward movement of the gate structure so that gate 36 may be stopped in the proper position with respect to the seat faces 48 in closing the valve. Plug 62 may be secured in opening 61 by welding 63.

The elongated gate structure is installed in body 10 by first installing gate 36 in the same manner as in the previously described embodiment. When gate 36 has been secured to stem 24, the latter is retracted to raise gate 36 in chamber 11 sufficiently to allow flow port 56 to be inserted through opening 17 beneath the lower end of gate 36, to which the flow port can then be attached by welding operations conducted through openings 17. The assembly of parts is, otherwise, the same as for the previously described embodiment.

From the foregoing, it will be evident that this invention provides valve constructions, particularly for automatic lubricated gate valves having the bonnet and body portions integrally formed, which are substantially leak-proof and of comparatively simple but, nevertheless, rugged construction, and which can be fabricated easily and relatively cheaply.

Although the illustrative embodiments have both shown rising-stem types of gate valves, it will be evident that the valve constructions described are equally applicable to non-rising stem valves.

It will be understood that numerous changes and modifications may be made in the details of the illustrative embodiments within the scope of the appended claims but without departing from the spirit of this invention.

What I claim and desire to secure by Letters Patent is:

1. A gate valve, comprising, a unitary body including a main body portion and a neck portion integral with the main body portion, a gate chamber in the main body portion, a stem-receiving bore in the neck portion, oppositely extending openings in the main body portion forming a flow passage communicating with the gate chamber, a stem in said bore and extending into the gate chamber, sealing means in said bore to seal about said stem, a through-conduit gate in said gate chamber secured to said stem, said gate being of segmented construction including in longitudinally spaced relation a closure portion and a ported portion for respectively closing and opening said flow passage, each of said portions being circular and slightly smaller in diameter than said openings whereby said portions may be separately inserted through said openings into the interior of said body for assembly therein into said gate, and separately fabricated flow nozzles inserted into said openings and secured therein with their inner ends defining annular gate seats positioned for slidable sealing engagement by the adjacent end faces of said gate, sealing areas about the opposed surfaces of the gate seats and gate faces, sealing material reservoirs formed within the side walls of said main body portion on opposite sides of said gate chamber, said reservoirs extending at an angle convergent to the vertical axis of the body and having their outer ends opening to the exterior of the body, channels providing communication between the inner ends of said reservoirs and the adjacent sealing areas, means closing the outer ends of said reservoirs, means to admit line pressure into the outer portions of said reservoirs from the interior of the gate chamber, and barrier means in each reservoir movable therein toward said channels in response to said line pressure.

2. A lubricated gate valve, comprising a one-piece body including a main body portion and a bonnet portion integral with the main body portion, a gate chamber in the main body portion, a flow passage intersecting the gate chamber, a stem extending through said bonnet portion into said gate chamber, a through-conduit gate member in said gate chamber secured to the stem, said gate member being of segmented construction including in longitudinally spaced relation a closure portion and a ported portion for respectively closing and opening said passage, each of said portions being circular and slightly smaller in diameter than said passage whereby said portions may be separately inserted through said passage into the interior of said body for assembly therein into said gate member, annular gate seats disposed in said passage interiorly of the gate chamber for slidable engagement with said portions as each is moved into registration with said gate seats, sealing material grooves in said gate seats, and means in said body for supplying sealing material to said grooves.

References Cited in the file of this patent

UNITED STATES PATENTS

| | | |
|---|---|---|
| 301,367 | Hoag | July 1, 1884 |
| 1,598,265 | Crook | Aug. 31, 1926 |
| 1,736,261 | Hallett | Nov. 19, 1929 |
| 1,960,125 | Smith | May 22, 1934 |
| 2,195,923 | Hehemann | Apr. 2, 1940 |
| 2,562,285 | Timmer | July 31, 1951 |
| 2,573,238 | Wunn | Oct. 30, 1951 |
| 2,653,789 | Eichenberg | Sept. 29, 1953 |
| 2,656,143 | Fantz | Oct. 20, 1953 |
| 2,660,397 | Volpin | Nov. 24, 1953 |
| 2,674,436 | Jones | Apr. 6, 1954 |

FOREIGN PATENTS

| | | |
|---|---|---|
| 104,157 | Switzerland | Apr. 16, 1924 |
| 471,417 | Great Britain | of 1937 |
| 1,010,678 | France | of 1952 |
| 742,579 | Great Britain | Dec. 30, 1955 |